(12) United States Patent
Parker et al.

(10) Patent No.: US 7,458,092 B1
(45) Date of Patent: Nov. 25, 2008

(54) CENTRALIZED IP VIDEO GATEWAY WITH PORT EXTENDERS HAVING REMOTE CONTROL INTERFACES

(75) Inventors: Benjamin J. Parker, Overland Park, KS (US); Shane W. Werner, Olathe, KS (US); Charles Diaz, Overland Park, KS (US); Terry M. Frederick, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1084 days.

(21) Appl. No.: 10/004,396

(22) Filed: Nov. 15, 2001

(51) Int. Cl.
*H04N 7/173* (2006.01)
*H04N 7/20* (2006.01)

(52) U.S. Cl. .................. 725/120; 725/78

(58) Field of Classification Search .......... 725/80–82, 725/78, 85, 118–120, 139–141, 151–153
See application file for complete search history.

(56) References Cited

U.S. PATENT DOCUMENTS

| | | | | |
|---|---|---|---|---|
| 5,708,961 A * | 1/1998 | Hylton et al. | .................. | 725/81 |
| 5,722,041 A * | 2/1998 | Freadman | ..................... | 725/82 |
| 6,005,861 A | 12/1999 | Humpleman | | |
| 6,026,150 A * | 2/2000 | Frank et al. | .............. | 379/90.01 |
| 6,192,399 B1 * | 2/2001 | Goodman | ..................... | 725/78 |
| 6,202,211 B1 * | 3/2001 | Williams, Jr. | .................. | 725/78 |
| 6,259,443 B1 | 7/2001 | Williams, Jr. | | |
| 6,264,559 B1 | 7/2001 | Lawrence et al. | | |
| 6,317,884 B1 * | 11/2001 | Eames et al. | ................. | 709/217 |
| 6,408,436 B1 * | 6/2002 | de Haas | ........................ | 725/86 |
| 6,493,874 B2 * | 12/2002 | Humpleman | ................. | 725/78 |
| 6,493,875 B1 * | 12/2002 | Eames et al. | .................. | 725/81 |
| 6,622,307 B1 * | 9/2003 | Ho | .............................. | 725/120 |
| 6,647,015 B2 * | 11/2003 | Malkemes et al. | .......... | 370/401 |
| 6,978,474 B1 * | 12/2005 | Sheppard et al. | .............. | 725/83 |
| 7,167,923 B2 * | 1/2007 | Lo | ............................. | 709/245 |
| 2002/0019984 A1 * | 2/2002 | Rakib | ........................ | 725/111 |
| 2003/0101459 A1 * | 5/2003 | Edson | ........................ | 725/82 |
| 2004/0255326 A1 * | 12/2004 | Hicks et al. | ................... | 725/81 |
| 2006/0080707 A1 * | 4/2006 | Laksono | ..................... | 725/38 |

FOREIGN PATENT DOCUMENTS

EP     1 117 214     7/2001

OTHER PUBLICATIONS

Postel, Jon; Internet Protocol DARPA Internet Program Protocol Specification; Sep. 1981; Information Sciences Institute.*
Scientific-Atlanta, Inc., Subscriber-Products—Explorer Set-tops, 2001.

* cited by examiner

*Primary Examiner*—Christopher Grant
*Assistant Examiner*—Omar Parra

(57) ABSTRACT

A centralized gateway connects to a broadband digital network for receiving various types of video feeds. The gateway provides output television signals directly to conventional inputs of standard television receivers. Port extenders connected to the gateway via a local-area network allow users to select a video feed sent by the gateway to a television associated with each port extender. The port extenders each provide a convenient and low cost termination point for keyboards, mice, joysticks, digital cameras, and other peripheral devices to interact with computer-based network services via the centralized gateway. The capabilities of the port extenders and the gateway provide a substitute for a personal computer in basic Internet access activities as well as a lower cost system for providing network based video programming to multiple televisions.

15 Claims, 8 Drawing Sheets

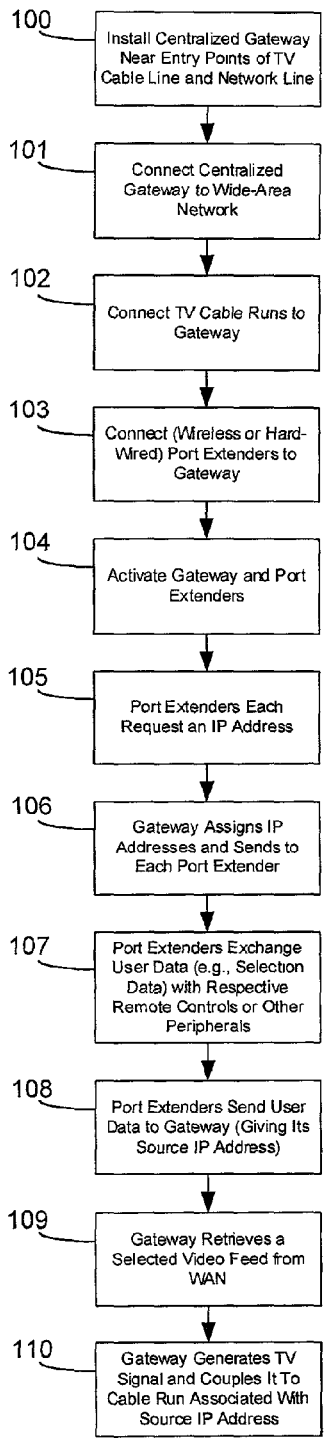
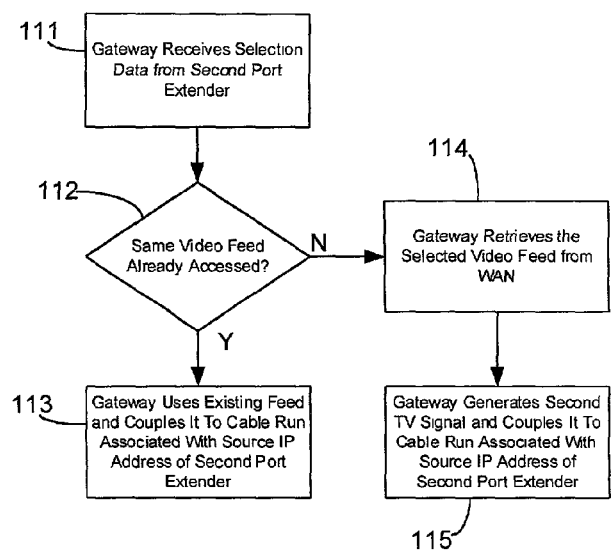
Fig. 9
Fig. 10

CENTRALIZED IP VIDEO GATEWAY WITH PORT EXTENDERS HAVING REMOTE CONTROL INTERFACES

BACKGROUND OF THE INVENTION

The present invention relates in general to distribution of video programs over digital networks, and, more specifically, to a central gateway apparatus for receiving and distributing video from a digital network (such as the Internet) to standard television sets within a site.

Use of a standard television set as a portal to the worldwide web has become available with the introduction of "set-top boxes" and other dedicated equipment that connects to an Internet service provider and to the television. Because of all the functionality that is required of the set-top box, it is a relatively expensive unit. For example, a set-top box for connecting with one television may include a modem, a powerful microprocessor and operating system, extensive RAM, a large hard disk drive, special purpose circuits, and numerous interfaces and controls. Thus, a consumer is faced with an investment similar to acquiring a personal computer for each television that is to be able to access set-top services. However, many homes or offices include two or more televisions throughout the site and the expense of providing a set-top box for each television becomes undesirably high.

With improvements in bandwidth of connections to the Internet and improvements in video and audio compression techniques, delivering a wide range of video content (e.g., Video On-Demand, IP TV, video conferencing, and other services) is becoming feasible. The potential breadth of unique video selections, services, or content in the content of the Internet or other digital networks is very great. Furthermore, existing programming provided by analog cable service and by analog and digital wireless broadcasting could be migrated to the digital networks. Thus, a home or business may come to rely heavily on digital networking for obtaining video services such as video information, entertainment, and communication.

In the prior art, receiving such video services has required either a computer workstation or a television with a set-top box. This limits the flexibility and utility of choosing digital networking as a video solution for the entire site of the home or office. Traditional analog cable or reception of wireless broadcasting has to be maintained because it is too expensive to equip each television with its own set-top box.

SUMMARY OF THE INVENTION

The present invention has the advantage of greatly reducing hardware costs in connection with providing digital networking video services to a plurality of conventional television sets.

In one aspect of the invention, apparatus for providing video content to a plurality of televisions comprise a centralized gateway and a plurality of port extender modules. The centralized gateway connects to the plurality of televisions and to a digital network supplying packet-based video content according to a plurality of selectable video feeds. The centralized gateway includes a wide-area network interface for receiving network packets from the digital network, a processor coupled to the wide-area network interface for initiating requests for selected video feeds and for converting the received network packets into at least one compressed data stream, a plurality of decoders coupled to the processor for uncompressing a respective data stream, and a plurality of television adapters coupled to the decoders and each adapted to be coupled to one of the televisions. The television adapters generate television signals usable by the televisions in response to a selected uncompressed data stream. The centralized gateway also includes at least one gateway-to-local-area network interface and an address server for assigning IP addresses, each assigned IP address corresponding to a respective one of the televisions.

Each port extender module is associated with a respective television and is responsive to a corresponding IP address. Each port extender module includes at least one peripheral device interface for connecting to a peripheral user device providing user data. The user data includes selection data to be provided to the processor to identify selected video feeds for the requests. Each port extender module also includes a local-area network interface coupled to the gateway-to-local-area network interface, and a protocol encapsulation processor for transporting the user data to the local-area network interface.

The local-area network may comprise an ethernet network using cable or wireless communication or may comprise signals multiplexed onto the coaxial cables that distribute the television signals.

BRIEF DESCRIPTION OF THE DRAWINGS

FIG. 9 is a flowchart of a preferred method of installing and operating the centralized gateway and port extenders of the present invention.

FIG. 10 is a flowchart showing a preferred method of avoiding redundant network access when a single video feed is selected at more than one television served by the centralized gateway.

DETAILED DESCRIPTION OF PREFERRED EMBODIMENTS

Figure 1:
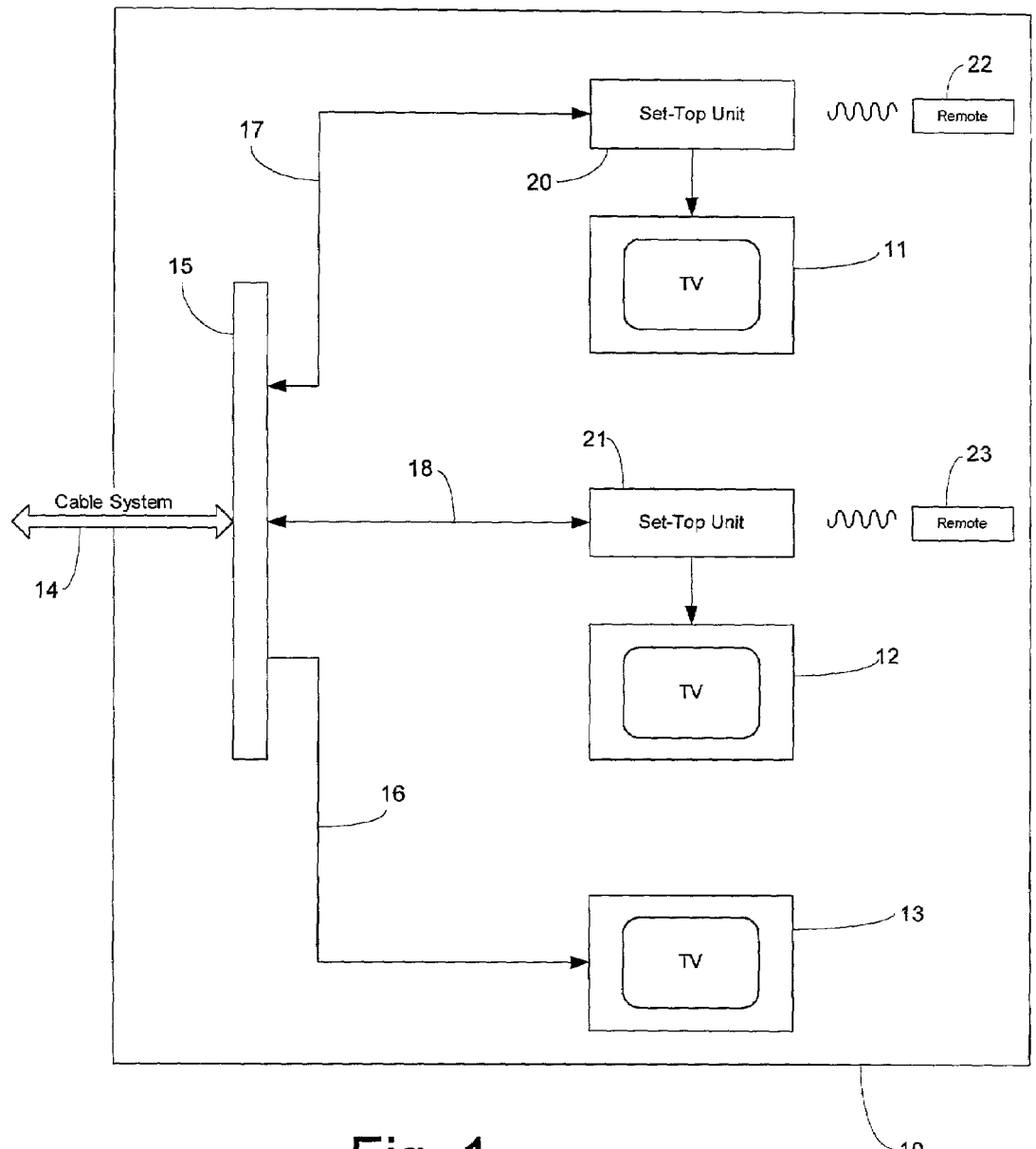
FIG. 1 is a block diagram of cable television distribution within a site.

Referring to FIG. 1, a site 10 (e.g., a home or office building) has a plurality of standard television sets 11, 12, and 13 deployed at various locations, such as in different rooms of a residence. These televisions are supplied with video content from a cable system via a cable line 14 connected to a site junction 15. Television 13 is shown as a cable-ready television and is connected directly to incoming cable line 14 by a television supply cable or cable run 16. Television 13 is representative of the vast majority of televisions currently in service in that it is capable of receiving only an analog composite signal and not any digital signals such as digital high-definition television (HDTV) or TCP/IP. Furthermore, television 13 has no provision for connecting peripheral devices such as joysticks, keyboards, digital cameras, or the like.

Televisions 11 and 12 are connected to set-top units 20 and 21, respectively, which are connected to the cable system via cable runs 17 and 18, respectively. Units 20 and 21 may be comprised of Explorer set-tops available from Scientific-Atlanta, Inc., for example. Depending upon the services made available by the cable system provider, units 20 and 21 may provide Internet browsing, Video On-Demand, e-mail, Voice-Over-IP, and/or other enhanced services. An integrated cable modem may be included in units 20 and 21, otherwise an external modem may be required. A user controls set-top units 20 and 21 with wireless remote controls 22 and 23, respectively, which may comprise a keyboard, for example.

In order to provide two locations (i.e., two televisions) at site 10 with independent access to the enhanced video services, investment in two full set-top systems is required.

The present invention provides independent access to digital video services at a plurality of televisions at a much lower investment and with greater flexibility. As shown in the preferred embodiment of FIG. 2, a centralized gateway 25 is connected to a high speed wide-area network (WAN) 26 which can be a cable system or a digital subscriber line (DSL) service, for example. WAN connection 26 can include more than one high speed connection if greater bandwidth is desired.

Figure 2:
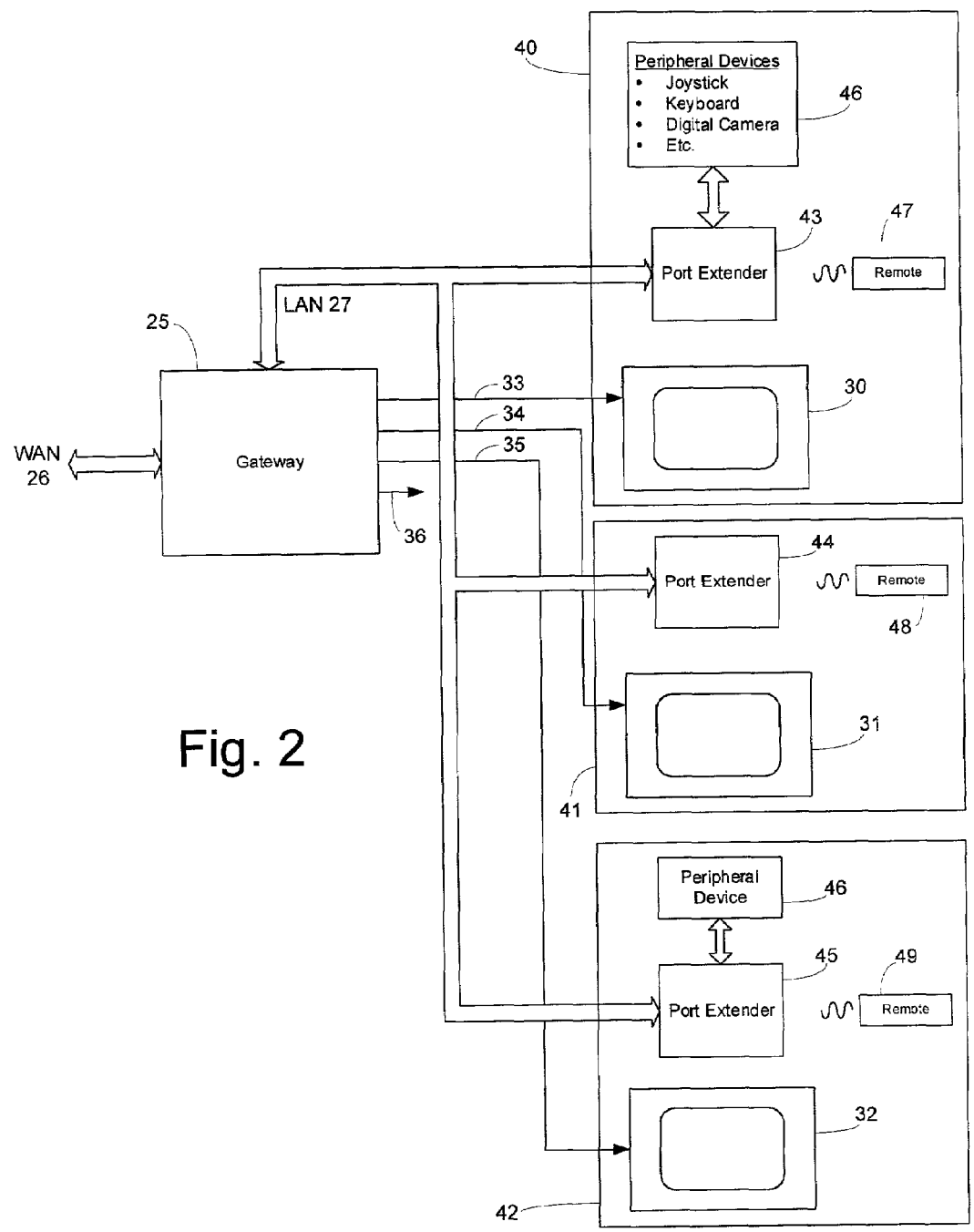
FIG. 2 is a block diagram of an improved distribution system of the present invention.

Gateway 25 is connected to a plurality of televisions 30, 31, and 32 in separate locations 40, 41, and 42 (i.e., separate rooms in a home) via cable runs 33, 34, and 35, respectively. The number of television connections that may be provided by gateway 25 may be limited by the bandwidth available for simultaneous video feeds that can be transferred from WAN 26. FIG. 2 shows support for up to four television connections with an output 36 not actually being used in the installation shown. Gateway 25 uses these connections to provide composite analog signals of the type usable by conventional televisions (e.g., in NTSC video format).

Gateway 25 forms a local-area network (LAN) over a LAN media 27. LAN 27 is also connected to a plurality of port extender modules 43, 44, and 45 which are preferably installed at locations 40, 41, and 42 for association with televisions 30, 31, and 32, respectively. Port extenders 43-45 handle all the user control associated with video services to be displayed on the respective television. In this embodiment, port extenders 43-45 have no direct connections to their respective televisions, their exact location depends only upon access to LAN media 27. For a LAN using physical wiring (e.g., UTP cable), a port extender may be typically installed as a wall wart at the termination of the UTP cable, for example. A wireless LAN can also be utilized such that the port extenders are movable, which may facilitate greater ease of connecting peripheral devices 46 such as a joystick, keyboard, digital camera, or the like. In an alternative embodiment described below, coaxial cable runs 33-36 provide the physical media for the local-area network and the port extenders are directly connected with the televisions.

Each port extender 43, 44, and 45 has a respective remote control device 47, 48, and 49. Preferably, each remote control device communicates with its respective port extender using a unique RF link, although other means such as infrared can be employed. Remote control devices 47-49 allow a user to generate user data including selection data to retrieve or otherwise control display of a video feed or other graphical information from gateway 25 to a respective television. The remote control devices have various control push buttons and can be similar in form to universal remote controls currently used to control conventional televisions. Alternatively, they may be styled similar to a conventional keyboard. In addition, selection data along with other user data can be generated using other peripheral devices as described below.

Figure 3:
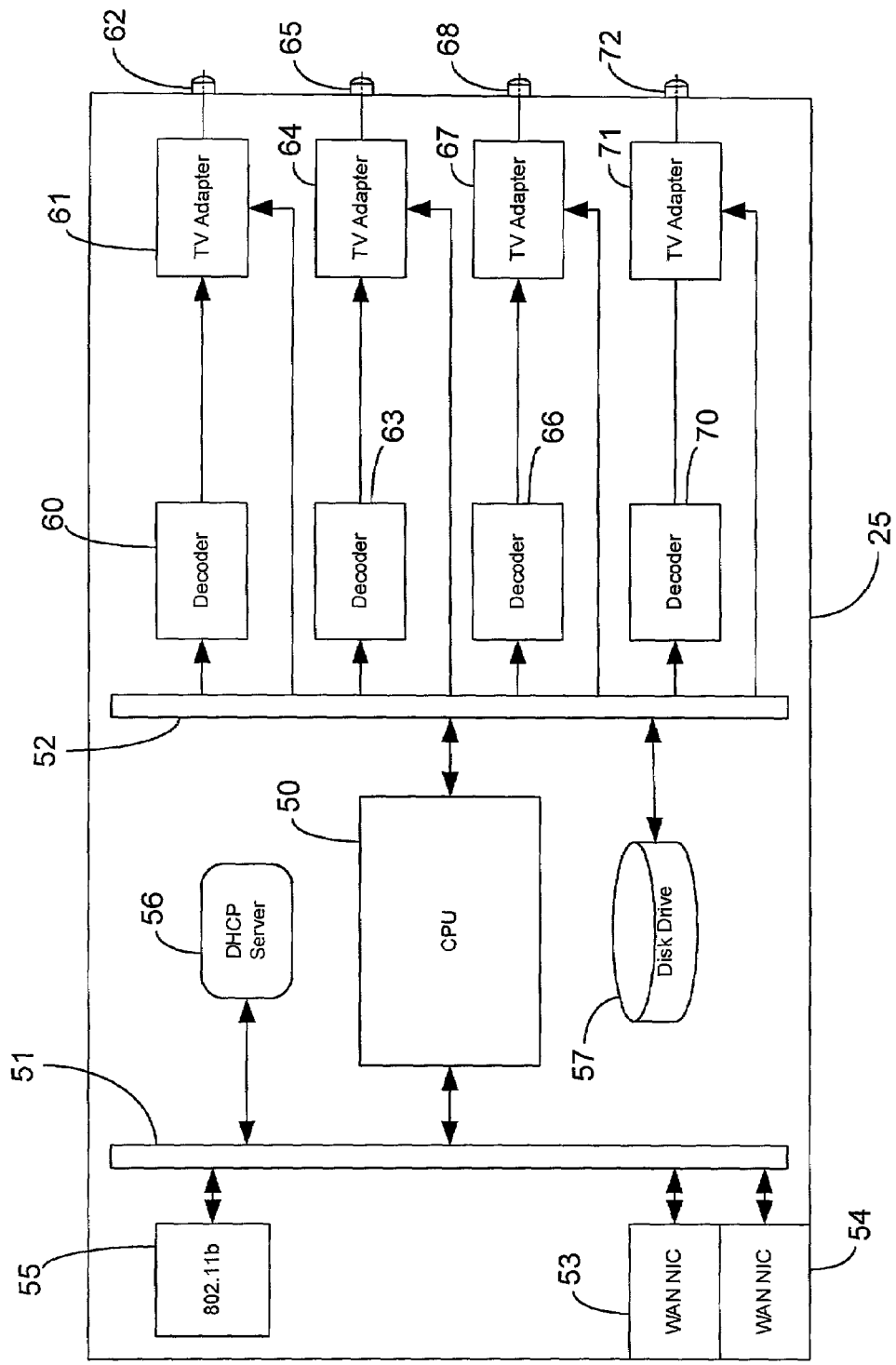
FIG. 3 is a schematic, block diagram showing a centralized gateway in greater detail.

As shown in FIG. 3, gateway 25 includes a central processing unit (CPU) 50 connected to a PCI bus 51 and a PCI bus 52. A WAN network interface controller (NIC) 53 and a WAN NIC 54 are connected to bus 51 and are adapted to be connected to a high speed network via a DSL modem or cable modem to an Internet service provider, for example. A wireless network interface controller 55 is connected to bus 51 and is coupled wirelessly to the port extenders so that it provides a gateway-to-local-area network interface. Wireless NIC 55 may use the 802.11b standard, for example.

A dynamic host-configuration protocol (DHCP) server 56 is coupled to wireless NIC 55 through bus 51. DHCP server 56 may preferably be a software application running on CPU 50. When any port extenders are first connected to the LAN, DHCP server 56 automatically configures them within the network to assign them unique IP addresses for subsequent addressing of network traffic to and from the port extenders. Each IP address also becomes associated with the particular television which is to be controlled by a respective port extender either automatically or during an initial set-up when a port extender is first activated in the network. Gateway 25 may be assigned a static address or addresses on the WAN, or if a dynamic address is used then DHCP server 56 operates to receive a dynamic address from the WAN.

A hard disk drive 57 is connected to CPU 50 via bus 52 and provides a storage media for video files and other files as known in the art. A decoder 60 (such as an MPEG-II decoder) is coupled to bus 52 and provides decoded audio and video signals to a TV adapter 61 which couples a television output signal to a coaxial cable connection 62 (and further to television 30 through cable run 33 in FIG. 2, for example). FIG. 3 shows a total of four output channels for connecting to four separate cable runs, each driving a respective television. Thus, decoders 63, 66, and 70 provide decoded audio and video signals to TV adapters 64, 67, and 71, respectively, which each couples a respective television output signal to a respective coaxial cable connection 65, 68, or 72. Each TV adapter 64, 67, and 71 is also connected directly to bus 52 for receiving graphical images or other video or audio signals that are not compressed and do not need to be decoded.

In operation, CPU 50 initiates requests for video feeds (e.g., streaming video, Video On-Demand, digital pay-per-view, or IP TV channels) based on selection data received as LAN traffic from a port extender. The WAN provides the requested video feed in the form of network packets addressed to gateway 25. The original selection data specifies an IP address assigned to the port extender originating a request. Network packets are converted into appropriate audio and video signals usable by a television. Based on the IP address of the original selection data, these signals are directed to the coaxial cable connection corresponding to the television or television supply cable associated with the port extender assigned to that IP address.

To conserve bandwidth, video and audio received from the WAN is typically compressed (e.g., using the MPEG-II format). CPU 50, after receiving network packets corresponding to a selected video feed, converts the network packet data into a compressed data stream. CPU 50 identifies the coaxial cable connection to which the audio/video content should be sent and sends the compressed data stream to the appropriate decoder. The compressed data stream is uncompressed in the decoder and forwarded to the TV adapter, which preferably generates an analog composite signal for transmitting to the television tuner (e.g., using a standard broadcast channel).

Video content from any video feed can be stored (i.e., recorded) in disk drive 57 in order to provide the functioning of a video recorder. The recorder preferably supports full motion video including pause, fast forward, rewind, and other functions normally found on a video recorder. These functions are controlled through the remote control interface of a port extender or through another peripheral device interface. Audio/video content is preferably stored in a compressed format.

Figure 4:
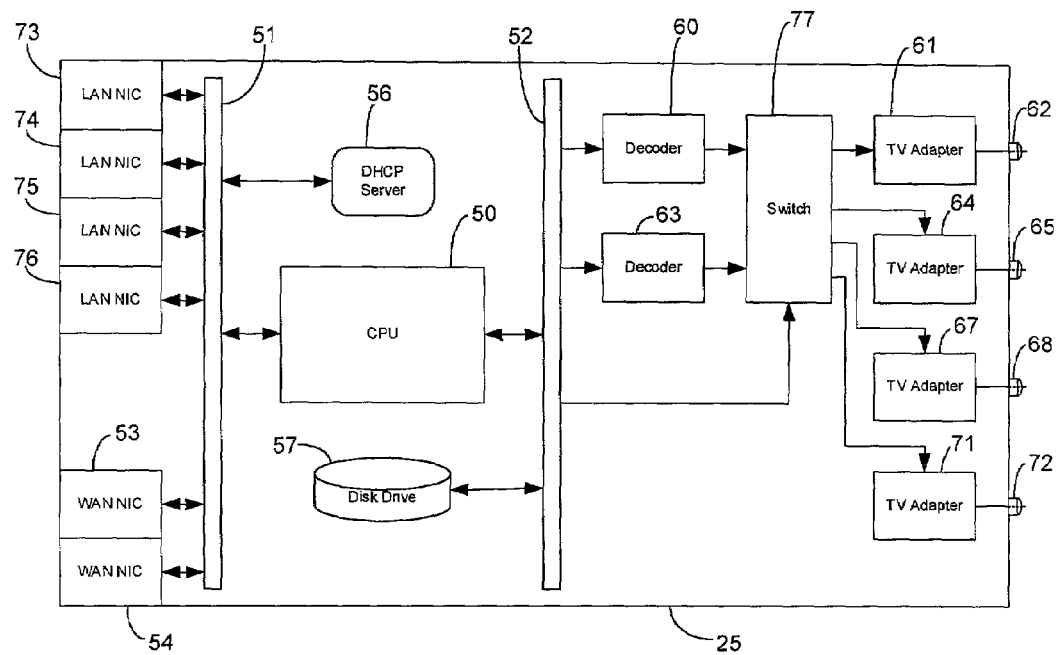
FIG. 4 is a schematic, block diagram of an alternative embodiment of the centralized gateway.

FIG. 4 shows an alternative embodiment of gateway 25 wherein a physical LAN media such as UTP cable is utilized instead of a wireless LAN media. Thus, LAN network interface controllers 73-76 are incorporated into gateway 25 to support the four separate output channels. A single LAN NIC could be used to connect to all port extenders using a shared communication link, but due to the high data rates associated with some peripheral devices to be connected to the port extenders separate NIC's and unshared UTP cables between each port extender and gateway 25 are preferred.

FIG. 4 also shows an alternative embodiment using fewer decoders. MPEG decoders can be a relatively expensive function to include in gateway 25. Thus, it may sometimes be desirable to reduce the number of available decoders since it would often be true that less than all of the televisions in a particular system were accessing separate compressed video feeds simultaneously. Therefore, a pair of decoders 60 and 63 have their decoded outputs connected to a switch 77. Switch 77 is also connected to bus 52 so that CPU 50 can configure switch 77 whereby each decoder output can be directed to any one or more of TV adapters 62, 65, 68, or 72.

Figure 5:
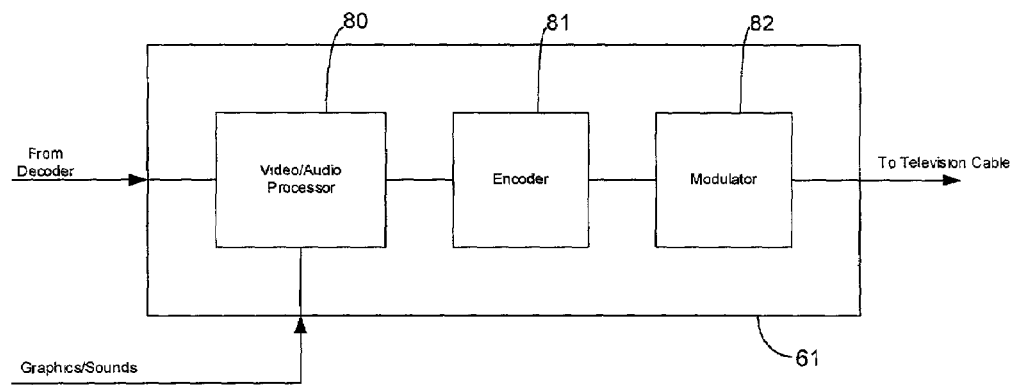
FIG. 5 is a block diagram showing a television adapter in greater detail.

A TV adapter is shown in greater detail in FIG. 5. A conventional video/audio processor 80 receives uncompressed video and audio signals from a decoder at one input and receives digital graphics (e.g., static video frames) at another input. Processor 80 generates analog audio/video signals using standard formatting. The audio/video signals from processor 80 are encoded into a standard television display format, such as NTSC, in an encoder 81. Finally, the encoded signals are modulated by a modulator 82 onto a standard broadcast channel (e.g., broadcast channel 3) for coupling to the input of a television via standard RG59 coaxial cabling installed in the site.

Figure 6:
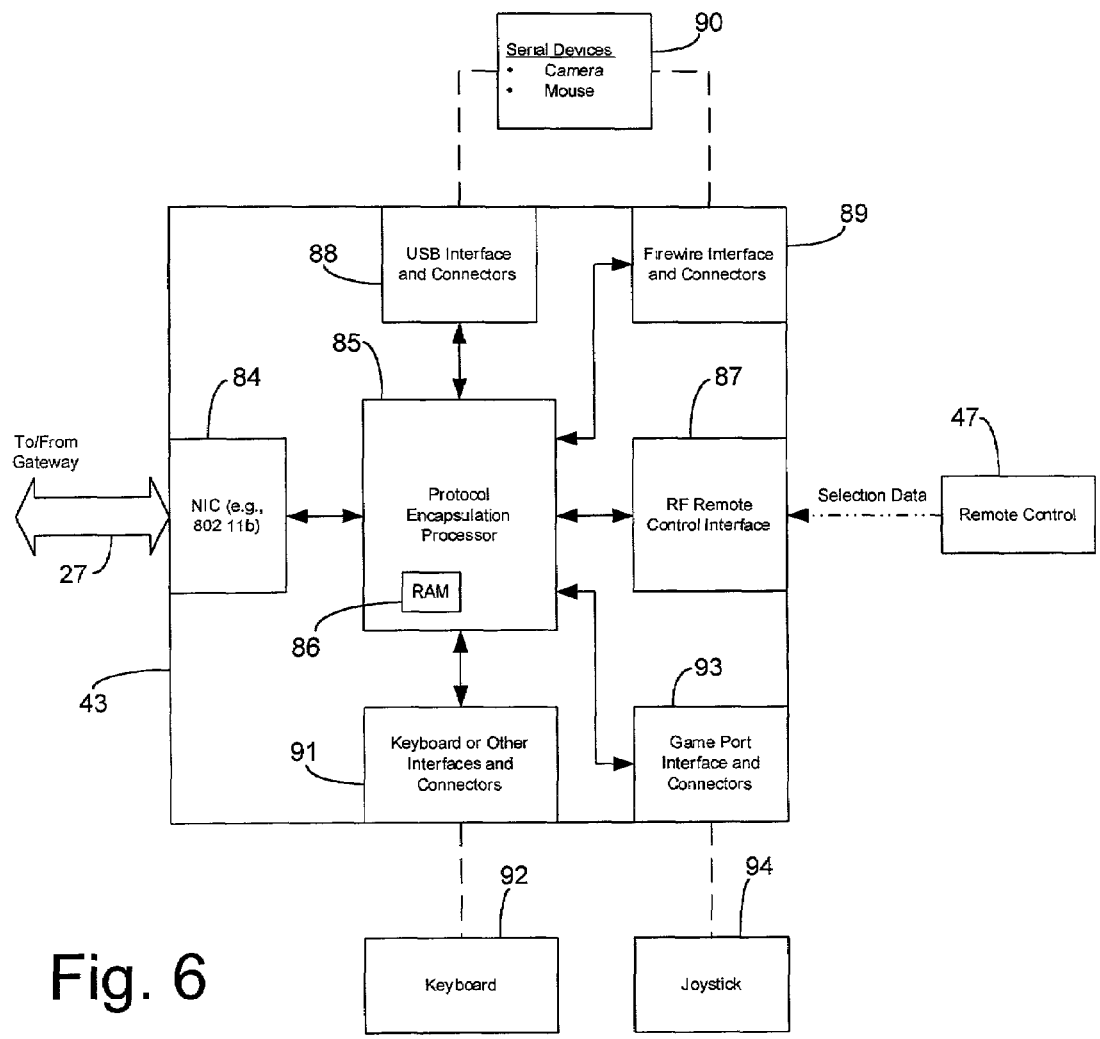
FIG. 6 is a block diagram showing a port extender module in greater detail.

A port extender module of the present invention is shown in greater detail in FIG. 6. Port extender 43 includes a protocol encapsulation processor 85. A network interface controller 84 is connected to processor 85 and interfaces the port extender to the gateway via the LAN media (either wired or wireless). Processor 85 includes a memory 86 which stores an IP address assigned to the port extender by the DHCP server.

Port extender 43 includes a plurality of peripheral interfaces for connecting to various peripheral devices. Each interface is connected to processor 85 which translates or encapsulates user data (including selection data) from the peripheral devices for transport to the gateway through NIC 84. Returning user data from the gateway is also extracted by processor 85 and passed to a respective peripheral interface.

The peripheral interfaces include an RF remote control interface 87 for initially receiving selection data from RF remote control 47. Preferably, a remote control similar to those controlling channel access for standard television program access is employed to provide a user experience similar to conventional television watching. Furthermore, remote control 47 may be a universal remote so that the television can still be controlled to use other signal inputs coupled to the television, such as a DVD player.

Serial interfaces contained on port extender 43 include a USB interface 88 and a Firewire interface 89. Each serial interface may include multiple connectors for simultaneously connecting to multiple serial devices 90 such as a digital camera or a mouse. A keyboard interface 91 is provided for a keyboard 92 and a game port interface 93 is provided for one or more joysticks 94 or other gaming devices using a standard game port connector.

The port extender as shown in FIG. 6 provides a convenient and low cost termination point for keyboards, mice, joysticks, digital cameras, and other peripheral devices to interact with computer-based network services via the centralized gateway. The capabilities of the port extender coupled with the gateway can provide a substitute for a personal computer in basic Internet access activities besides offering a lower cost system for providing network based video programming to multiple televisions. Furthermore, the port extender can be made very small and can thus be easily hidden behind an entertainment island, for example.

Figure 7:
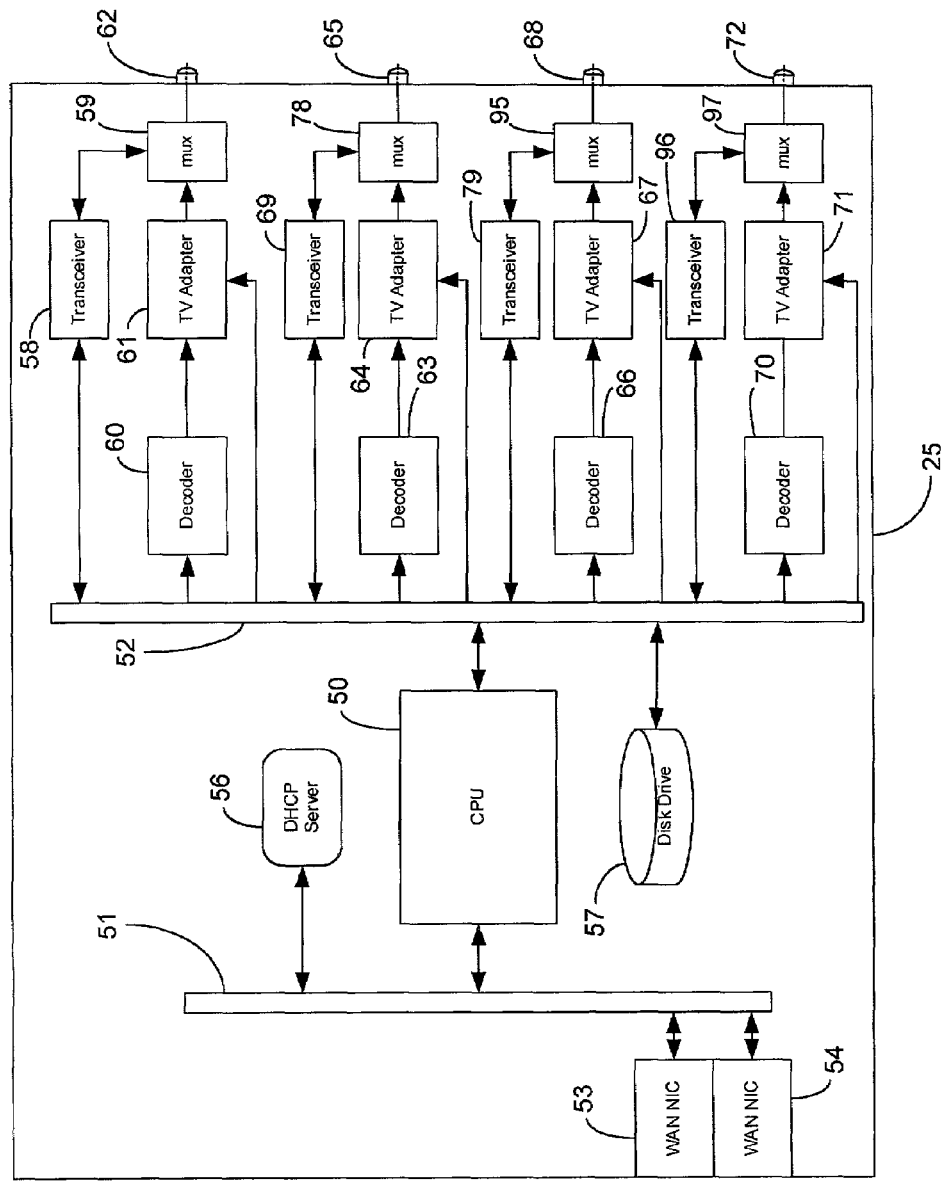
FIG. 7 is a schematic, block diagram of an alternative embodiment of the centralized gateway.
Figure 8:
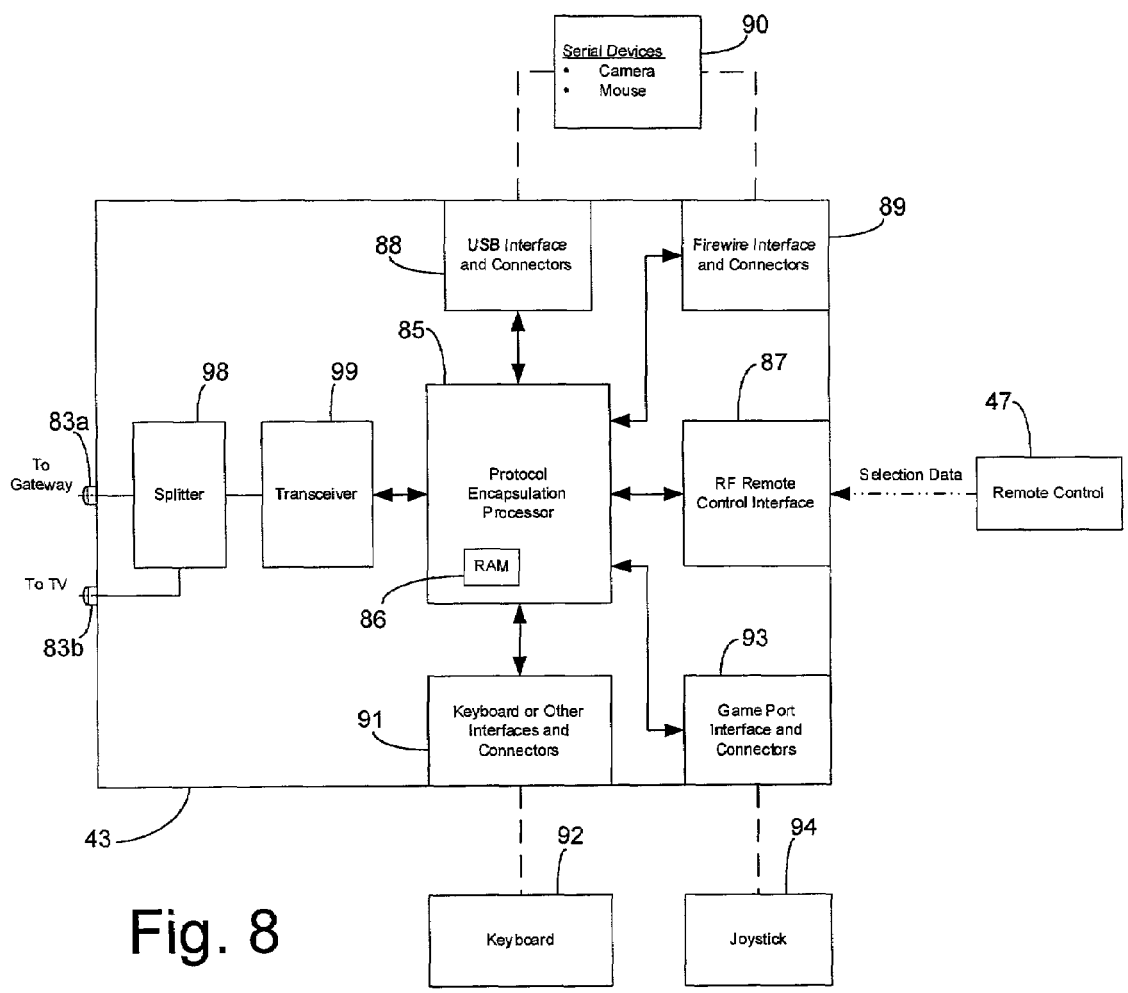
FIG. 8 is a block diagram showing a port extender module used with the gateway of FIG. 7.

FIGS. 7 and 8 show an alternative embodiment using the RG59 coaxial cable runs between gateway 25 and the televisions as the physical media for the LAN. Due to the size or construction of a site, a wireless LAN may not always be feasible or affordable, thus requiring a hardwired local-area network. This embodiment may be less expensive to implement for certain sites since separate LAN cables do not have to be installed.

As shown in FIG. 7, each output connection 62, 65, 68, and 72 of gateway 25 has an associated transceiver 58, 69, 79, and 96, respectively, and a multiplexer 59, 78, 95, and 97, respectively. Preferably, the transceivers operate in a different frequency band than the band occupied by the television signals from the TV adapters. Each multiplexer sums transmitted signals from its respective transceiver with the television signals from its respective TV adapter and couple the summed signal to the respective cable run to a television. Return signals from the port extenders are coupled from the cable runs to the input of each transceiver 58, 69, 79, and 96 by multiplexers 59, 65, 68, and 72. Each multiplexer may be comprised of bandpass filters and a summing amplifier or may be constructed using a duplexer, for example.

FIG. 8 shows a modified port extender including a splitter 98 connected to the cable run via a connector 83a and a transceiver 99 connected between splitter 98 and processor 85. Splitter 98 has a television signal output for directing television signals received from the gateway to a coaxial connector 83b. Splitter 98 may be comprised of an isolation transformer or may include bandpass filters so that network control and data signals in the separate frequency band do not reach the television, for example.

Transceiver 99 and its matching transceiver in the gateway connected to the same cable run communicate using a protocol that supports the data rates desired. Furthermore, each transceiver (i.e., in each port extender and in the gateway) must interface with its local processor. This interface may preferably be comprised of a PCI bus interface, for example.

Any of the foregoing embodiments of the present invention can be easily installed in any site using existing television cable wiring or by installing new cable wiring. FIG. 7 shows a preferred installation and operating method where existing cable wiring is available. In step 100, a centralized gateway is installed near the entry points of a TV cable line from a cable TV provider. If the broadband Internet connection to be used is the same cable, then this location is obviously also the proper location for making the necessary digital network connection(s). If a DSL connection is being used, the entry point is typically in the same immediate area. Thus, the centralized gateway is connected to the wide-area network in step 101.

In step 102, the TV adapter outputs of the gateway are connected to individual TV cable runs. Except where the TV cable provides the media for the local-area network, it must be noted at this point which TV is associated with each cable run so that when a corresponding port extender module is installed near the TV that it can be properly associated to the correct TV adapter. When the gateway employs separate network interface controllers individually hardwired to each port extender by UTP network cable, then this association can be achieved at least partly automatically. In the event that a wireless LAN is employed, then a set-up procedure is preferably provided to allow a user to make the association.

In step 103, the port extenders are connected to the centralized gateway. The gateway and port extenders are activated in step 104. Upon initialization, the port extenders determine that they do not have an assigned IP address within the LAN and consequently each request an IP address from the gateway in step 105. The gateway assigns IP addresses and sends them to each respective port extender in step 106.

Normal operation begins in step 107 with the port extenders exchanging user data (such as video feed selection data or video recorder selection data) with respective remote control devices or other peripheral devices as well as with the gateway. Standard network protocols are used.

Specifically with regard to selection data, the port extenders send selection data from the television users to the gateway in step 108. The protocol encapsulation processor utilizes its assigned IP address as the source IP address in network packets it transmits to the gateway, thus identifying the TV adapter output that should receive the requested video feed. In step 109, the gateway retrieves the selected video feed from the WAN. Alternatively, if the selected video feed is a video file recorded on the hard drive storage media, then the video feed is retrieved from there instead of from the WAN. The gateway generates a resulting television signal and couples it to the cable run associated with the source IP address in step 110.

In a further embodiment of the invention, redundant retrieval of a video feed is avoided as shown in FIG. 8. Assuming one video feed is already being retrieved as requested by one port extender module, the gateway receives selection data from a second port extender in step 111. In step 112, the gateway determines whether the same video feed is already being accessed for another port extender. If it is, then the gateway uses the existing feed and couples it to the cable run associated with the source IP address of the second port extender in step 113. If the video feed is not already being accessed, then the gateway retrieves the second selected video feed from the WAN in step 114. The gateway generates the second television signal in step 115 and couples it to the cable run associated with the source IP address of the second port extender.

What is claimed is:

1. Apparatus for providing video content to a plurality of televisions located at a site, comprising:
    a centralized gateway at a centralized gateway location within said site for connecting to said plurality of televisions and to a digital network supplying packet-based video content according to a plurality of selectable video feeds, wherein said centralized gateway comprises:
        a wide-area network interface in said centralized gateway for receiving network packets from said digital network;
        a processor in said centralized gateway coupled to said wide-area network interface for initiating requests for selected video feeds and for converting said received network packets into at least one compressed data stream;
        a plurality of decoders in said centralized gateway coupled to said processor for uncompressing a respective data stream;
        a plurality of television adapters in said centralized gateway coupled to said decoders and each adapted to be coupled to one of said televisions, said television adapters generating television signals usable by said televisions without further processing in response to a selected uncompressed data stream;
        at least one gateway-to-local-area network interface in said centralized gateway; and
        an address server in said centralized gateway for assigning IP addresses, each assigned IP address corresponding to a respective one of said televisions; and
    a plurality of port extender modules located separately from said centralized gateway, each associated with a respective television and responsive to a corresponding IP address, wherein said television signals are not processed by said port extender modules, and wherein each port extender module comprises;
        at least one peripheral device interface in said port extender module for connecting to a peripheral user device providing user data, said user data including selection data to be provided to said processor to identify selected video feeds for said requests;
        a local-area network interface in said port extender module coupled to said gateway-to-local-area network interface; and
        a protocol encapsulation processor in said port extender module for transporting said user data to said local-area network interface which forwards said user data to said processor in said centralized gateway.

2. The apparatus of claim 1 wherein each of said port extender modules is located proximate to its respective television.

3. The apparatus of claim 1 further comprising a wireless communication link between said gateway-to-local area network interface and said local-area network interface.

4. The apparatus of claim 1 wherein said gateway-to-local area network interface and said local-area network interface are comprised of respective transceivers coupled together via a cable carrying said television signals.

5. The apparatus of claim 1 further comprising a network UTP cable connected between said gateway-to-local area network interface and said local-area network interface.

6. The apparatus of claim 1 wherein said peripheral device interface includes a remote control interface for receiving said selection data from a remote control device.

7. The apparatus of claim 6 wherein said gateway includes a storage media containing a compressed video file, and wherein said selection data can further select viewing of said video file at said respective television.

8. The apparatus of claim 1 wherein said processor determines whether selection data from one port extender module is equivalent to selection data from another port extender module and, if they are equivalent, provides a corresponding video feed to both televisions corresponding to said one and another port extenders.

9. The apparatus of claim 1 wherein said peripheral device interface includes a serial bus interface.

10. The apparatus of claim 1 wherein said peripheral device interface includes a game-port interface.

11. The apparatus of claim 1 wherein said peripheral device interface includes a keyboard interface.

12. The apparatus of claim 1 wherein said television adapters comprise outputs for connecting to a standard television coaxial cable.

13. The apparatus of claim 1 wherein said centralized gateway includes a plurality of gateway-to-local-area network interfaces, each connected to a respective one of said port extender modules.

14. A method for providing video content in a facility having a plurality of televisions, said method comprising the steps of:

connecting a centralized gateway at a centralized gateway location within said facility to a digital network that supplies packet-based video content according to a plurality of selectable video feeds;

connecting a first television supply cable to a first respective television adapter output of said centralized gateway, said first respective television adapter being in said centralized gateway;

connecting a second television supply cable to a second respective television adapter output of said centralized gateway, said second respective television adapter being in said centralized gateway;

connecting a first port extender module to said centralized gateway, said first port extender being associated with a first television coupled to said first television supply cable, said first port extender module being located separately from said centralized gateway;

connecting a second port extender module to said centralized gateway, said second port extender being associated with a second television coupled to said second television supply cable, said second port extender module being located separately from said centralized gateway;

said first port extender module communicating with said centralized gateway to request an IP address;

said centralized gateway assigning a first IP address to said first port extender module, said centralized gateway further associating said first IP address with said first television adapter;

said second port extender module communicating with said centralized gateway to request an IP address;

said centralized gateway assigning a second IP address to said second port extender module, said centralized gateway further associating said second IP address with said second television adapter;

said first port extender module communicating with a first remote control for identifying a first selected video feed;

said first port extender module sending selection data to said centralized gateway in response to said first selected video feed, said selection data including said first IP address; and said centralized gateway retrieving said first selected video feed from said digital network and generating a corresponding first television signal at said first television adapter, wherein said centralized gateway identifies said first television adapter in response to said first IP address, wherein said first television signal is reproducible by said first television without further processing, and wherein said first television adapter sends said first television signal to said first television over said first television supply cable such that said first television signal is not processed by said first port extender module.

15. The method of claim 14 further comprising the steps of:

said second port extender module communicating with a second remote control for identifying a second selected video feed;

said second port extender module sending selection data to said centralized gateway in response to said second selected video feed, said selection data including said second IP address;

said centralized gateway comparing said first selected video feed and said second selected video feed;

if said first and second selected videos feeds are the same, then said centralized gateway coupling said first television signal to said first and second television adapters simultaneously; and if said first and second selected videos feeds are not the same, then said centralized gateway retrieving said second selected video feed from said digital network and generating a corresponding second television signal at said second television adapter, wherein said centralized gateway identifies said second television adapter in response to said second IP address.

* * * * *